United States Patent
Pang et al.

(10) Patent No.: US 9,874,776 B2
(45) Date of Patent: Jan. 23, 2018

(54) DISPLAY SUBSTRATE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Lu Pang, Beijing (CN); Dongsheng Huang, Beijing (CN); Zhinan Zhang, Beijing (CN); Wenpeng Zhang, Beijing (CN); Xiao Xin, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/742,887

(22) Filed: Jun. 18, 2015

(65) Prior Publication Data

US 2016/0266443 A1 Sep. 15, 2016

(30) Foreign Application Priority Data

Mar. 11, 2015 (CN) .......................... 2015 1 0106985

(51) Int. Cl.
*G02F 1/1335* (2006.01)
*G02F 1/1337* (2006.01)
(Continued)

(52) U.S. Cl.
CPC .... *G02F 1/133512* (2013.01); *G02F 1/13394* (2013.01); *G02F 1/133784* (2013.01); *G02F 2001/134345* (2013.01)

(58) Field of Classification Search
CPC ......... G02F 1/133784; G02F 1/133512; G02F 1/13394
See application file for complete search history.

(56) References Cited

U.S. PATENT DOCUMENTS

| 7,423,718 B2* | 9/2008 | Sumi ................. G02F 1/133707 349/106 |
| 8,792,073 B2* | 7/2014 | Ishitani ................. G02F 1/1339 349/106 |

(Continued)

FOREIGN PATENT DOCUMENTS

| CN | 103513470 A | 1/2014 |
| KR | 20030048655 A | 6/2003 |

OTHER PUBLICATIONS

First Office Action regarding Chinese application No. 201510106985.0, dated Jan. 22, 2017. Translation provided by Dragon Intellectual Property Law Firm.

*Primary Examiner* — Dung Nguyen
(74) *Attorney, Agent, or Firm* — Harness, Dickey & Pierce, P.L.C.

(57) ABSTRACT

The present disclosure provides a display substrate and a display device. The display substrate includes a subpixel, a black matrix arranged around the subpixel, and a spacer arranged on the black matrix. At least a portion of the black matrix includes a primary region and a secondary region, one of which is arranged between two adjacent subpixels in an alignment rubbing direction. The spacer is arranged on the primary region, and an alignment rubbing shadow is shielded by the primary region.

15 Claims, 4 Drawing Sheets

(51) Int. Cl.
*G02F 1/1339* (2006.01)
*G02F 1/1343* (2006.01)

(56) References Cited

U.S. PATENT DOCUMENTS

| | | | |
|---|---|---|---|
| 9,081,235 B2 * | 7/2015 | Ji | G02F 1/133514 |
| 9,164,328 B2 * | 10/2015 | Takeuchi | G02F 1/13394 |
| 2005/0128382 A1 * | 6/2005 | Baek | G02F 1/13394 |
| | | | 349/106 |
| 2012/0268700 A1 * | 10/2012 | Shu | G03F 7/0007 |
| | | | 349/106 |

* cited by examiner

DISPLAY SUBSTRATE AND DISPLAY DEVICE

CROSS-REFERENCE TO RELATED APPLICATION

The present application claims a priority of the Chinese patent application No. 201510106985.0 filed on Mar. 11, 2015, which is incorporated herein by reference in its entirety.

TECHNICAL FIELD

The present disclosure relates to the field of display technology, in particular to a display substrate and a display device.

BACKGROUND

A display device includes a color filter substrate, a liquid crystal layer and an array substrate arranged sequentially. FIG. 1 shows a color filter substrate for the display device in the related art, wherein it includes a display region 1' (also referred to as a subpixel), a black matrix 2' arranged around the display region 1, a spacer 3' arranged on the black matrix 2', and an alignment film 4' in contact with the liquid crystal layer. The spacer 3' is of a relatively large thickness, so as to support the color filter substrate and the array substrate, thereby to provide the display device with a certain thickness. A surface of the alignment film 4' is rubbed with a rubbing roller, so as to align liquid crystal molecules in the display device in a certain direction. During the rubbing, due to the spacer 3', the rubbing roller cannot reach the alignment film at either side of a bottom of the spacer 3', so a surface of the alignment film 4' at this position is not rubbed, or not rubbed sufficiently. A portion 41' of the alignment film 4' which is not rubbed or not rubbed sufficiently is usually referred to as an alignment rubbing shadow.

When an alignment rubbing direction is parallel to an extension direction of a gate line on the array substrate, a projection of the alignment rubbing shadow in a vertical direction completely falls within a range of the black matrix. However, when the alignment rubbing direction is parallel to an extension direction of a data line on the array substrate, the projection of the alignment rubbing shadow in the vertical direction extends to the display region 1' outside the black matrix 2'. At this time, when a light beam passes through the disordered liquid crystals at a region where the alignment rubbing shadow 41' overlaps the display region 1', light leakage will occurs at the display region, and thereby a display effect of the display device will be adversely affected.

SUMMARY

An object of the present disclosure is to provide a display substrate and a display device, so as to prevent the occurrence of light leakage at a display region of a display device in the related art.

In one aspect, the present disclosure provides in embodiments a display substrate, including a subpixel, a black matrix arranged around the subpixel, and a spacer arranged on the black matrix. At least a portion of the black matrix includes a primary region and a secondary region, one of which is arranged between two adjacent subpixels in an alignment rubbing direction. The spacer is arranged on the primary region, and an alignment rubbing shadow is shielded by the primary region.

Alternatively, in the alignment rubbing direction, a distance between two subpixels arranged at both sides of the primary region is greater than a distance between two subpixels arranged at both sides of the secondary region.

Alternatively, in the alignment rubbing direction, the primary regions and the secondary regions are arranged alternately at a regular interval.

Alternatively, a sum of a width of any primary region and a width of the secondary region adjacent thereto is of a constant value in the alignment rubbing direction.

Alternatively, the primary regions or the secondary regions are arranged between two adjacent rows of the subpixels arranged in a direction perpendicular to the alignment rubbing direction.

Alternatively, in a direction perpendicular to the alignment rubbing direction, the primary regions and the secondary regions are arranged alternately at a regular interval between two adjacent rows of the subpixels.

Alternatively, in the alignment rubbing direction, a distance between two subpixels at both sides of the secondary region is greater than or equal to 10 μm.

Alternatively, in the alignment rubbing direction, a distance between two subpixels at both sides of the primary region is 30 μm, and a distance between two subpixels at both sides of the secondary region is 10 μm.

Alternatively, the spacer is arranged at a center line of the primary region perpendicular to the alignment rubbing direction.

Alternatively, the spacer is arranged in the vicinity of a center line of the primary region perpendicular to the alignment rubbing direction, and offset toward a direction opposite to the alignment rubbing direction.

In another aspect, the present disclosure further provides in embodiments a display device including the above-mentioned display substrate.

According to the display substrate in embodiments of the present disclosure, the spacer is located at the primary region that can shield the alignment rubbing shadow, so the alignment rubbing shadow cannot extend to the display region of the display device. As a result, it is able to prevent the occurrence of light leakage at the display region, thereby to improve a display effect of the display device.

BRIEF DESCRIPTION OF THE DRAWINGS

In order to illustrate the technical solutions of the present disclosure or the related art in a more apparent manner, the drawings desired for the present disclosure or the related art will be described briefly hereinafter. Obviously, the following drawings merely relate to some embodiments of the present disclosure, and based on these drawings, a person skilled in the art may obtain the other drawings without any creative effort.

DETAILED DESCRIPTION

The present disclosure will be described hereinafter in a clear and complete manner in conjunction with drawings and embodiments. Obviously, the following embodiments are merely a part of, rather than all of, embodiments of the present disclosure, and based on these embodiments, a person skilled in the art may, without any creative effort, the other embodiments, which also fall within the scope of the present disclosure.

Figure 1:
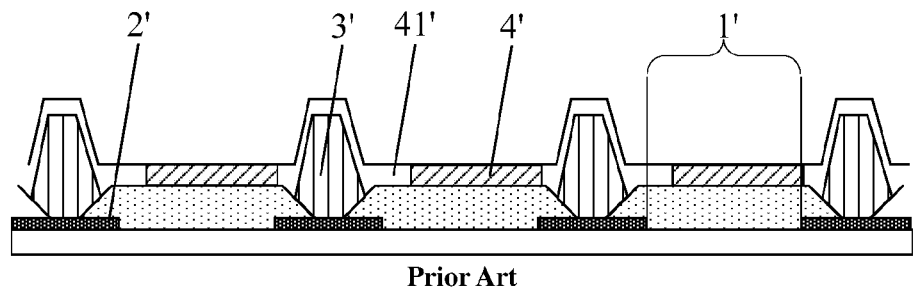
FIG. 1 is a schematic view showing a cross-section of a color filter substrate in the related art.
Figure 2:
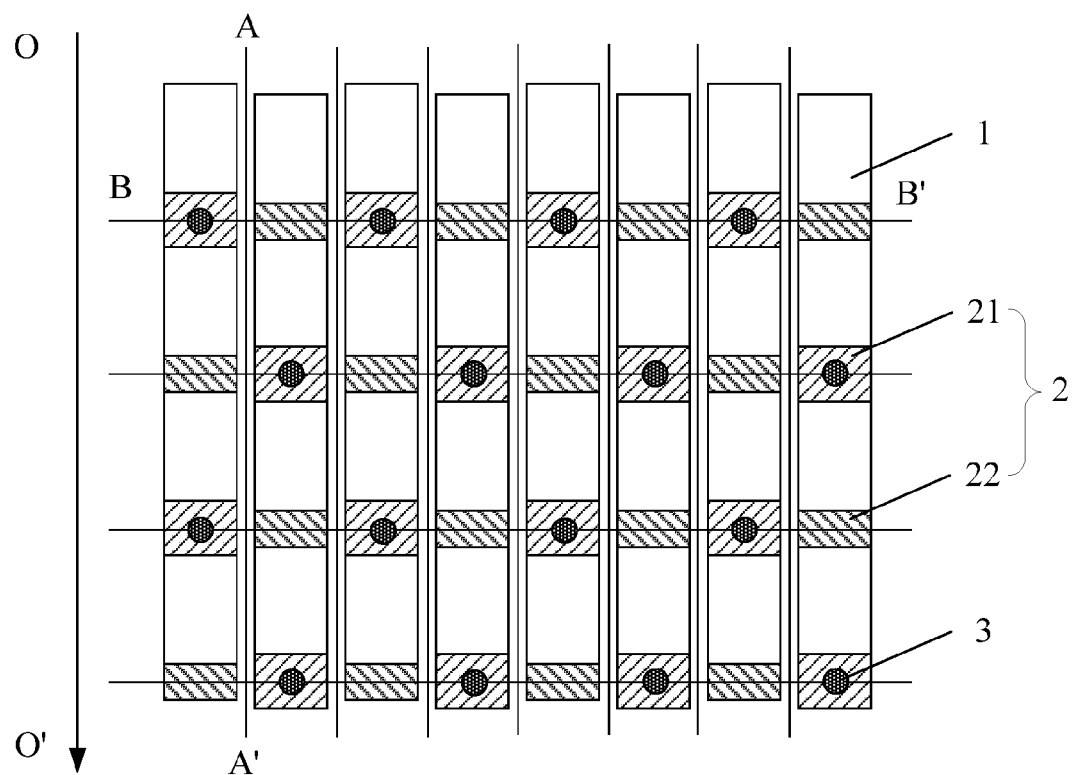
FIG. 2 is a schematic view showing a cross-section of a display substrate according to an embodiment of the present disclosure.

As shown in FIG. 2, the present disclosure provides in embodiments a display substrate, which includes a subpixel 1, a black matrix 2 arranged around the subpixel 1, and a spacer 3 arranged on the black matrix 2. At least a portion of the black matrix 2 includes a primary region 21 and a secondary region 22, one of which is arranged between two adjacent subpixels 1 in an alignment rubbing direction OO'. The spacer 3 is arranged on the primary region 21, and an alignment rubbing shadow is shielded by the primary region 21.

It should be appreciated that, the display substrate according to embodiments of the present disclosure may be an array substrate or a color filter substrate. In this embodiment, the color filter substrate is taken as an example, and at this time a RGB film is provided for the subpixel. When an alignment film of the display substrate is rubbed, the alignment rubbing direction OO' is parallel to an extension direction of a data line AA" on the array substrate.

It should be appreciated that, in this embodiment, a portion of the black matrix 2 may include the primary region 21 and the secondary region 22. Typically, the entire black matrix 2 includes the primary region 21 and the secondary region 22.

It should be further appreciated that, in this embodiment, the spacer 3 is arranged on the primary region 21. In order to enable the primary region 21 to shield the alignment rubbing shadow, a coverage range of the primary region 21 may be enlarged in the alignment rubbing direction OO', so that the coverage range of the primary region 21 is greater than a coverage range of the black matrix between two adjacent subpixels in the related art in the alignment rubbing direction OO'. Further, in order to reduce an effect on an aperture ratio of the display substrate, a coverage range of the secondary region 22 is shortened in the alignment rubbing direction OO' while enlarging the coverage range of the primary region 21 in the alignment rubbing direction, so that the coverage range of the secondary region 22 in the alignment rubbing direction OO' is less than the coverage range of the black matrix between two adjacent subpixels in the related art in the alignment rubbing direction OO'. In other words, the coverage range of the primary region 21 is greater than the coverage range of the secondary region 22 in the alignment rubbing direction OO'. At this time, the subpixel 1 moves in a direction where the coverage region of the primary region 21 is increased.

In this embodiment, the primary region may be of, e.g., a rectangular shape, so as to simplify a manufacturing method for the display substrate. Of course, the primary region may also be of any other shapes. For example, in the alignment rubbing direction, edges at two sides of the primary region may each be of an arc shape. As compared with the primary region with a rectangular shape, this kind of primary region occupies a smaller area, so it is able to enlarge an area of the subpixel, thereby to improve the aperture ratio of the display substrate.

In order to facilitate the understanding of the display substrate in embodiments of the present disclosure, the following three display substrates are provided, with a difference merely in an arrangement mode of the primary regions and the secondary regions in the alignment rubbing direction.

Figures 3A, 3B, 3C:
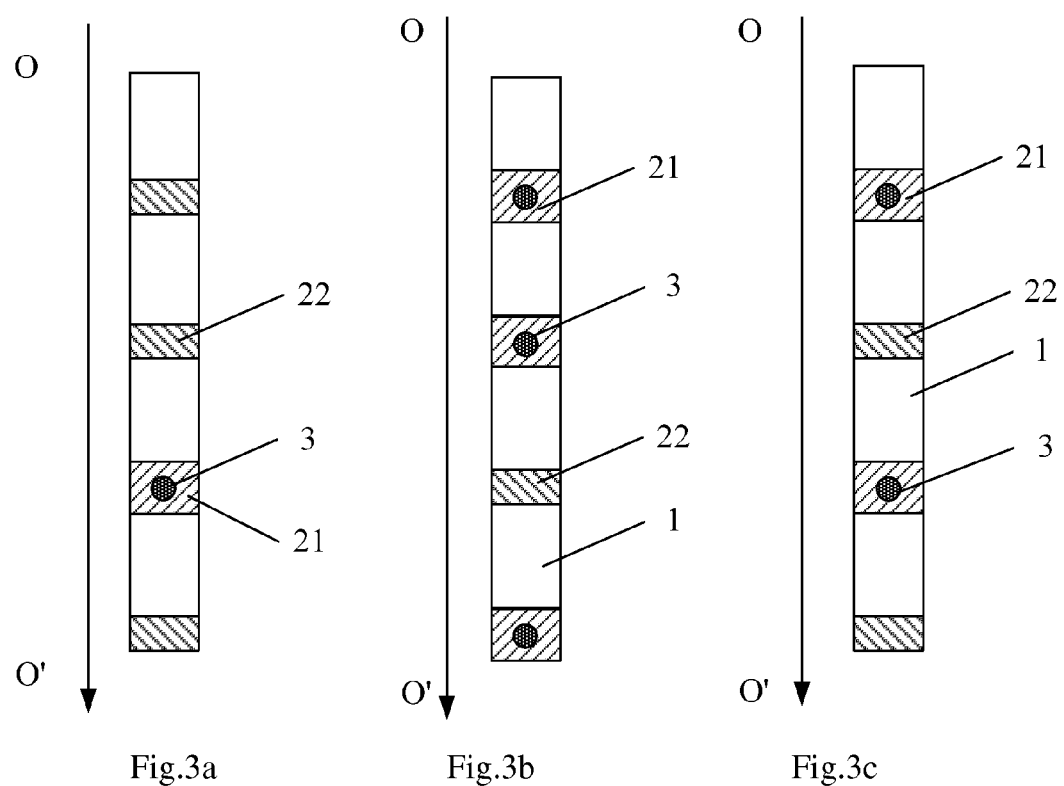
FIG. 3a is a schematic view showing a cross-section of a display substrate according to another embodiment of the present disclosure.
FIG. 3b is a schematic view showing a cross-section of a display substrate according to yet another embodiment of the present disclosure.
FIG. 3c is a schematic view showing a cross-section of a display substrate according to still yet another embodiment of the present disclosure.

For the display substrate as shown in FIG. 3a, the primary regions 21 are arranged at an interval of at least two secondary regions 22 in the alignment rubbing direction OO', so the number of the primary regions 21 is less than the number of the secondary regions 22. The spacer 3 is arranged at the primary region 21 rather than the secondary region 22, so that there are fewer spacers 3 and the coverage range of the secondary regions 22 is less than the coverage range of the primary region 21. Hence, through this arrangement mode, it is able to improve the aperture ratio of the display substrate.

For the display substrate as shown in FIG. 3b, the secondary regions 22 are arranged at an interval of at least two primary regions 21 in the alignment rubbing direction OO', so the number of the primary regions 21 is greater than the number of the secondary regions 22 and there are more spacers 3. Through this arrangement mode, a thickness of a liquid crystal cell may be supported by the spacers in a manner better than by the spacer in the display substrate in FIG. 3a.

For the display substrate as shown in FIG. 3c, the primary regions 21 and the secondary regions 22 are arranged alternately at a regular interval, so the number of the primary regions 21 is equal to the number of the secondary regions 22, and the number of the spacers 3 is between those for the display substrate in FIG. 3a and those for the display substrate in FIG. 3b. In addition, because the number of the primary regions 21 is equal to the number of the secondary regions 22, the coverage range of the primary regions 21 is greater than, and complementary to, the coverage range of the secondary regions 22 in the alignment rubbing direction OO'. Hence, through this arrangement mode, it is able to improve the aperture ratio of the display substrate while supporting the thickness by the spacers in a better manner.

Of course, based on the display substrates in FIGS. 3a, 3b and 3c, a person skilled in the art may obtain the other display substrates without any creative effort, which are not particularly defined herein.

According to the display substrate in embodiments of the present disclosure, the spacer is arranged at the primary region that can shield the alignment rubbing shadow, so the alignment rubbing shadow cannot extend to the display region of the display device. As a result, it is able to prevent the occurrence of light leakage at the display region, thereby to improve a display effect of the display device.

In order to further facilitate the understanding of the display substrate in embodiments of the present disclosure, the display substrate will be described hereinafter by taking a rectangular primary region as an example.

As shown in FIG. 2, a width of the primary region 21 is a greater than that of the secondary region 22 in the alignment rubbing direction OO', so that the alignment rubbing shadow can be shielded by the primary region 21.

Further, the primary regions 21 and the secondary regions 22 are arranged alternately at a regular interval in the alignment rubbing direction OO', so it is able to improve an aperture ratio of the display substrate and distribute the spacers evenly.

Furthermore, a sum of the widths of any primary region 21 and the secondary region 22 adjacent thereto in the alignment rubbing direction OO' is of a constant value. Illustratively, the width of the primary region 21 in the alignment rubbing direction OO' is d1, the width of the secondary region 22 in the alignment rubbing direction OO' is d2, and a width of the subpixel 1 in the alignment rubbing direction OO' is d3, so a width of a subpixel region in the alignment rubbing direction OO' is d3+(d1+d2)/2 (the subpixel region is a region defines by gate lines BB' and data lines AA' arranged on the array substrate in a crisscross manner). The width of any subpixel region in the alignment rubbing direction OO' is of a constant value and d1+d2 is also of a constant value, so the width d3 of any subpixel 1 in the alignment rubbing direction OO' is of a constant value too. In addition, as compared with a width of the black matrix between two adjacent subpixels in the alignment rubbing direction in the related art, in embodiments of the present disclosure, an increment in the width of the primary region 21 may be equal to a decrement in the width of the secondary region 22. At this time, the width of the subpixel 1 in embodiments of the present disclosure may be equal to the width of the subpixel in the related art in the alignment rubbing direction OO'. Of course, the increment in the width of the primary region 21 may be not equal to the decrement in the width of the secondary region 22 in the alignment rubbing direction OO'. At this time, the width of the subpixel 1 in embodiments of the present disclosure may be not equal to the width of the subpixel in the related art in the alignment rubbing direction OO'.

In the alignment rubbing direction OO', when the primary regions 21 and the secondary regions 22 are arranged alternately at a regular interval, the primary regions 21 and the secondary regions 22 may also be arranged in the following modes.

Figure 4:
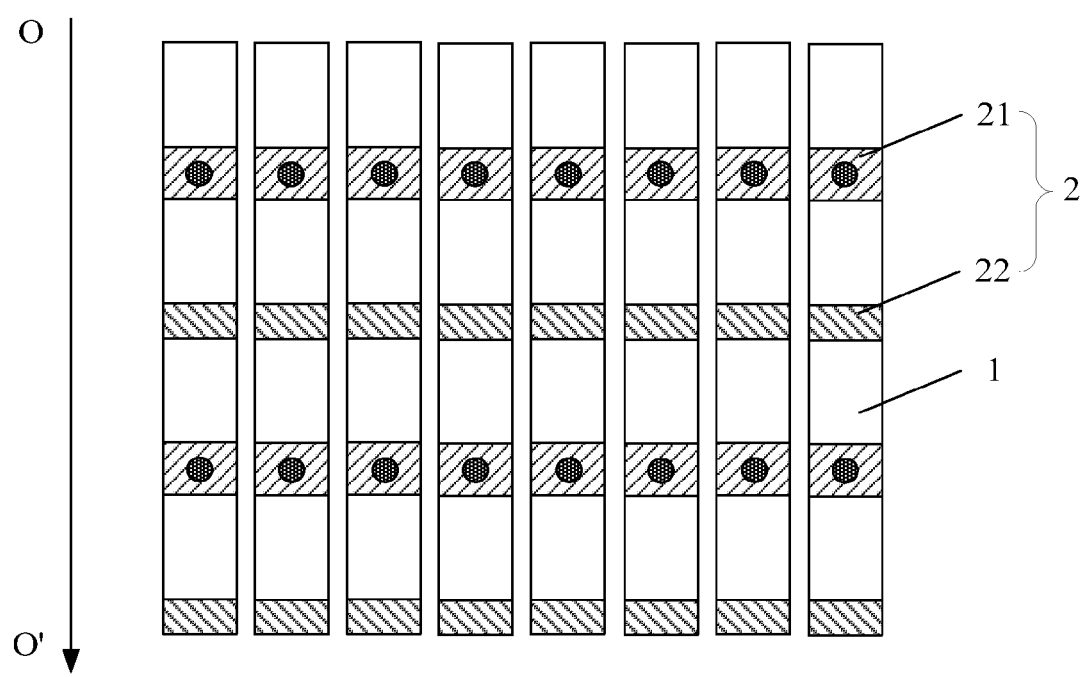
FIG. 4 is a schematic view showing a cross-section of a display substrate according to still yet another embodiment of the present disclosure.

In the first mode, as shown in FIG. 4, the primary regions 21 or the secondary regions 22 are arranged between two adjacent rows of the subpixels 1 in a direction perpendicular to the alignment rubbing direction OO'. In this mode, it is able to provide the display substrate with a simple structure.

In the second mode, as shown in FIG. 2, the primary regions 21 and the secondary regions 22 are arranged alternately at a regular interval between two adjacent rows of the subpixels 1 in a direction perpendicular to the alignment rubbing direction OO'. In this mode, the primary regions 21 and the secondary regions 22 are arranged alternately at a regular interval in both the alignment rubbing direction OO' and the direction perpendicular thereto, so it is able to prevent the occurrence of fringes on the display device.

The display device includes a color filter substrate and an array substrate arranged opposite to each other to form a cell. In embodiments of the present disclosure, when the display substrate is the color filter substrate, as shown in FIG. 2, the black matrices 2 on the color filter substrate are used to shield the gate lines BB' and the data lines AA'' on the array substrate. When the alignment rubbing direction OO' is parallel to an extension direction of the data line AA', the primary regions 21 and the secondary regions 22 are used to shield the gate lines BB'. Further, in order to shield the gate lines BB', the width of the secondary region 22 in the alignment rubbing direction OO' is greater than or equal to 10 µm.

Illustratively, the width of the primary region 21 in the alignment rubbing direction OO' is 30 µm, and the width of the secondary region 22 in the alignment rubbing direction OO' is 10 µm. At this time, the alignment rubbing shadow may be shielded by the primary region 21, and the gate line BB' may be shielded by the secondary region 22.

Further, as shown in FIG. 2, the spacer 3 may be arranged at a center line of the primary region 21 perpendicular to the alignment rubbing direction OO', so as to simplify the structure of the display substrate. When the alignment rubbing direction OO' is parallel to the extension direction of the data line AA' on the array substrate, the extension direction of the gate line BB' is perpendicular to the alignment rubbing direction OO'. At this time, a projection of the center line of the primary region 21 perpendicular to the alignment rubbing direction OO' onto the array substrate coincides with the gate line BB'.

Figure 5:
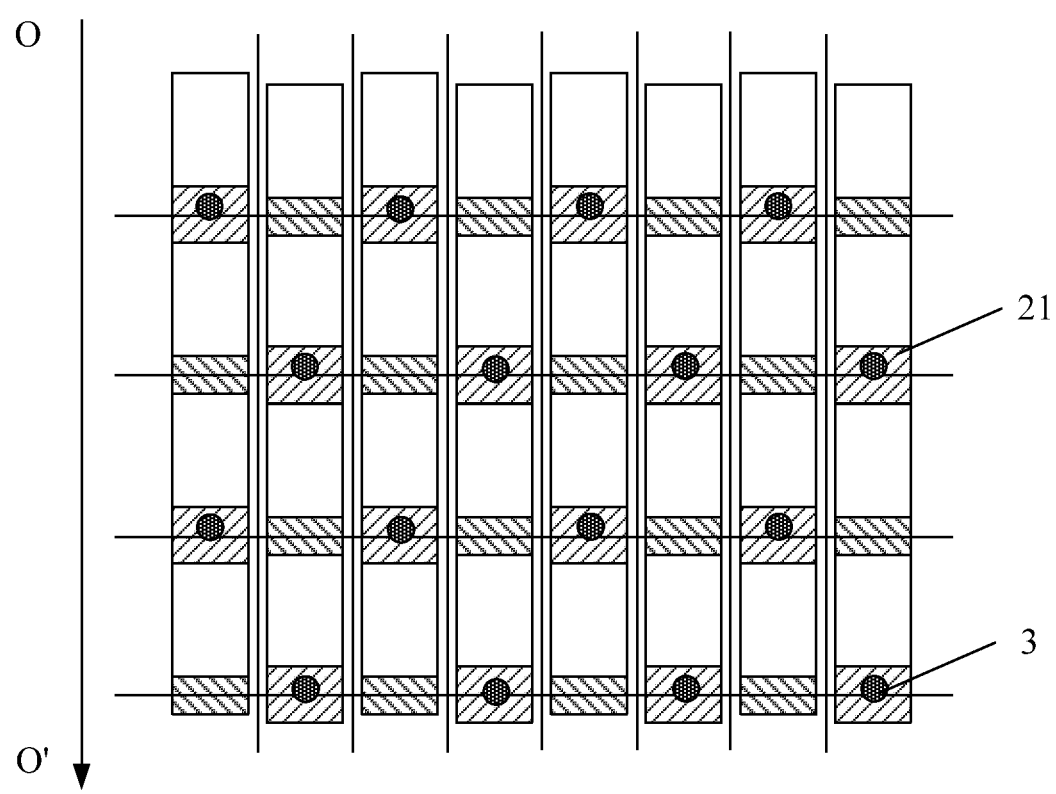
FIG. 5 is a schematic view showing a cross-section of a display substrate according to still yet another embodiment of the present disclosure.

When the alignment rubbing is performed on the display substrate, the alignment rubbing shadows at two sides of the spacer 3 are of different widths in the alignment rubbing direction OO'. The alignment rubbing shadow at an upstream of the alignment rubbing direction OO' is of a width greater than that at a downstream of the alignment rubbing direction OO', so the spacer 3 may be offset toward a direction opposite to the alignment rubbing direction OO'. In other words, as shown in FIG. 5, the spacer 3 is arranged in the vicinity of the center line of the primary region 21 perpendicular to the alignment rubbing direction OO' and offset toward the direction opposite to the alignment rubbing direction OO'.

Of course, based on the above two arrangement modes of the primary regions and the secondary regions, a person skilled in the art may obtain the other arrangement modes without any creative effort, which will not be particularly defined herein.

The present disclosure further provides in embodiments a display device including the above-mentioned display substrate. The display device may be any product or member having a display function, such as a liquid crystal panel, an electronic paper, a mobile phone, a flat-panel PC, a TV, a display, a laptop PC, a digital photo frame or a navigator.

Due to the above-mentioned display substrate, it is also able for the display device in embodiments of the present disclosure to prevent the occurrence of light leakage at the display region.

The above are merely the preferred embodiments of the present disclosure, but shall not be used to limit the scope of the present disclosure. It should be appreciated that, a person skilled in the art may make further modifications and improvements without departing from the principle of the present disclosure, and these modifications and improvements shall also fall within the scope of the present disclosure.

What is claimed is:

1. A display substrate, comprising a subpixel, a black matrix arranged around the subpixel, and a spacer arranged on the black matrix, wherein at least a portion of the black matrix comprises a primary region and a secondary region, one of which is arranged between two adjacent subpixels in an alignment rubbing direction, and the other of the primary region and the secondary region is arranged between another two adjacent subpixels in the alignment rubbing direction, the spacer is arranged on the primary region, and an alignment rubbing shadow is shielded by the primary region, and the primary regions and the secondary regions are arranged alternately at a regular interval in the alignment rubbing direction.

2. The display substrate according to claim 1, wherein a width of the primary region is greater than a width of the secondary region in the alignment rubbing direction.

3. The display substrate according to claim 2, wherein the width of the secondary region in the alignment rubbing direction is greater than or equal to 10 μm.

4. The display substrate according to claim 3, wherein the width of the primary region in the alignment rubbing direction is 30 μm, and the width of the secondary region in the alignment rubbing direction is 10 μm.

5. The display substrate according to claim 2, wherein the spacer is arranged at a center line of the primary region perpendicular to the alignment rubbing direction.

6. The display substrate according to claim 1, wherein a sum of a width of any primary region and a width of the secondary region adjacent thereto is of a constant value in the alignment rubbing direction.

7. The display substrate according to claim 1, wherein the primary regions or the secondary regions are arranged between two adjacent rows of the subpixels in a direction perpendicular to the alignment rubbing direction.

8. The display substrate according to claim 1, wherein the primary regions and the secondary regions are arranged alternately at a regular interval between two adjacent rows of the subpixels in a direction perpendicular to the alignment rubbing direction.

9. The display substrate according to claim 1, wherein the spacer is arranged at a center line of the primary region perpendicular to the alignment rubbing direction.

10. The display substrate according to claim 1, wherein the spacer is arranged in the vicinity of a center line of the primary region perpendicular to the alignment rubbing direction, and offset toward a direction opposite to the alignment rubbing direction.

11. The display substrate according to claim 2, wherein the spacer is arranged in the vicinity of a center line of the primary region perpendicular to the alignment rubbing direction, and offset toward a direction opposite to the alignment rubbing direction.

12. A display device comprising the display substrate according to claim 1.

13. The display device according to claim 12, wherein the alignment rubbing direction is parallel to an extension direction of a data line in the display device.

14. The display device according to claim 12, wherein a projection of a center line of the primary region perpendicular to the alignment rubbing direction onto the display substrate coincides with a gate line in the display device.

15. The display substrate according to claim 1, wherein each of edges at two sides of the primary region is of an arc shape or a straight-line shape.

* * * * *